United States Patent [19]
Stenzenberger et al.

[11] 3,712,557
[45] Jan. 23, 1973

[54] CASSETTE AND SUPPLY REEL FOR USE IN CASSETTE-LOADED CINEMATOGRAPHIC APPARATUS

[75] Inventors: Volkmar Stenzenberger, Unterhaching; Klaus Fuchsle; Fridolin Hennig, both of Munich, all of Germany

[73] Assignee: Agfa-Gevaert Aktiengesellschaft, Leverkusen, Germany

[22] Filed: March 25, 1971

[21] Appl. No.: 127,936

[30] Foreign Application Priority Data

March 26, 1970 Germany..................P 20 14 872.5

[52] U.S. Cl. ...................242/197, 242/74, 352/72
[51] Int. Cl......G03b 1/04, G11b 15/32, G11b 23/04
[58] Field of Search......242/197, 200, 71.8, 74, 74.1; 352/72, 78, 157, 158; 274/4 C, 11 C

[56] References Cited

UNITED STATES PATENTS 3,354,776  11/1967  Smitzer et al....................242/74 X

FOREIGN PATENTS OR APPLICATIONS 1,296,509  5/1969  Germany..................242/74

*Primary Examiner*—Leonard D. Christian
*Attorney*—Michael S. Striker

[57] ABSTRACT

A cassette for use in cassette-loaded motion picture projectors has a pair of sections one of which carries a separable retaining member which can be used to secure the inner end of convoluted motion picture film to the hub of a supply reel. The retaining member is glued to or integral with the respective section and can be broken off by the user to be inserted into a socket of the supply reel in order to clamp the inner end of the film against the inner side of the hub. The position of the retaining member on the one section can be such that a supply reel can be inserted into the housing only when the retaining member is detached. The retaining member does not interfere with insertion of an empty supply reel.

14 Claims, 5 Drawing Figures

PATENTED JAN 23 1973

3,712,557

INVENTOR
VOLKMAR STENZENBERGER
KLAUS FÜCHSLE
BY FRIDOLIN HENNIG

CASSETTE AND SUPPLY REEL FOR USE IN CASSETTE-LOADED CINEMATOGRAPHIC APPARATUS

BACKGROUND OF THE INVENTION

The present invention relates to cassettes or cartridges and to supply reels for use in cinematographic apparatus, especially in cassette-loaded motion picture projectors. More particularly, the invention relates to improvements in cassettes or cartridges which are intended for use in cassette-loaded motion picture projectors and serve to accommodate supply reels of the type wherein the inner end of motion picture film which is convoluted around the hub of the reel can be separably but firmly clamped to the hub to prevent detachment when the projector is in use.

It is already known to employ in motion picture projectors cassettes or cartridges for supply reels carrying lengths of convoluted motion picture film. Such projectors are provided with a film withdrawing mechanism (also called stripper mechanism) which can automatically withdraw the leader of motion picture film from a properly inserted cassette to advance the leader into the range of a threading mechanism which continues to transport the leader along a predetermined path and to attach the leader to the core of a takeup reel. It is further known to provide such projectors with an automatic rewinding mechanism which responds to tensioning of the film upon completion of a projection cycle and carries out a rewind cycle by convoluting the film back onto the supply reel in the cassette. In order to insure that the tensioning of motion picture film upon completion of the projection cycle cannot result in actual separation of the trailing or inner end of the film from the hub of the supply reel, the latter must be provided with a suitable film retaining or clamping device which insures that the inner end of the film will not become separated from the supply reel when the projection cycle is completed and while the takeup reel tends to continue its rotary movement in a direction to withdraw the film from the supply reel.

The inner end of the film need not be clamped to the hub of the supply reel if the latter is installed in a cassette for use in motion picture projectors without an automatic rewind feature. Thus, the takeup reel in such a projector should be capable of collecting the entire film. Since the cassette which is to be used in a projector with an automatic rewind feature should also be capable of being used in the first mentioned projectors wherein the rewind cycle is started in automatic response to completion of the projection cycle, it is customary to furnish the cassette with a supply reel and with a discrete retaining member which can be used to clamp the inner end of convoluted motion picture film to the hub of the supply reel before the cassette is inserted into or otherwise mounted on a projector with automatic rewind feature. In other words, it is up to the user or operator of the motion picture projector to decide that the inner end of film on the supply reel should be clamped to the hub of the supply reel before the cassette is mounted in or on the projector. An absent-minded person is likely to forget to clamp the inner end of film to the hub of the supply reel with the result that the film cannot be automatically rewound on the supply reel upon completion of the projection cycle. Furthermore, many presently known film retaining or clamping devices are hard to handle and their configuration is such that an unskilled operator is likely to attach them to the supply reel in an improper position so that the inner end of the film is free to become completely disengaged from the supply reel at the end of a projection cycle.

SUMMARY OF THE INVENTION

An object of the invention is to provide a novel and improved cassette or cartridge which can be used in cassette-loaded motion picture projectors with or without automatic film rewinding means and which is designed in such a way that the user is less likely to forget to clamp the inner end of motion picture film to the supply reel prior to insertion of a cassette containing such supply reel into a projector with automatic rewinding means.

Another object of the invention is to provide a novel and improved film retaining device which can be used to securely clamp the inner end of motion picture film to the hub of a supply reel for use in a cassette for cassette-loaded motion picture projectors.

A further object of the invention is to provide a novel and improved supply reel which can be used with the improved retaining member and can be inserted into cassettes for cassette-loaded motion picture projectors.

An additional object of the invention is to provide a film retaining member which is designed to prevent insertion of a film-supporting supply reel into a cassette for cassette-loaded motion picture projectors but does not interfere with the insertion of an empty supply reel.

Still another object of the invention is to provide a cassette for cassette-loaded cinematographic apparatus with an integral part which can serve as a reminder to the operator that the inner end of motion picture film on a supply reel must be attached to the hub of the supply reel prior to insertion of the reel into the cassette if the latter is to be used in cinematographic apparatus with automatic rewinding means and which can also serve as a simple, convenient and inexpensive means for clamping the inner end of film to the supply reel.

One feature of the invention resides in the provision of a cassette for use in cassette-loaded cinematographic apparatus, particularly in motion picture projectors with or without automatic film rewinding means. The cassette comprises a housing which is preferably composed of two separable sections and defines a chamber for reception of a reel of the type comprising a hub surrounded by a supply of convoluted motion picture film having an inner end adjacent to the hub, and a film retaining or clamping member which can be used to clamp the inner end of the film to the hub of a reel and which is separably secured to the housing of the cassette, preferably in such position that a film-supporting reel cannot be inserted into the chamber unless the retaining member is separated from the housing. Thus, the operator is reminded that the retaining member must be detached from the housing and used to clamp the inner end of the film to the reel because the separation of the retaining member is necessary in order to permit the film-supporting reel to enter and to be properly located in the chamber of the housing.

The retaining member may be made integral with or bonded (e.g., glued) to one section of the housing or to a part (e.g., an arcuate film confining member) which is integral with or is otherwise connected to the housing.

The reel for use in the improved cassette is preferably provided with a socket which can receive a portion of or the entire retaining member. The latter may consist of elastomeric material and can be forcibly introduced into the socket so as to urge a portion of the film against the inner side of the hub which is provided with a suitable slot for introduction of the inner end of the film. The retaining member may be U-shaped and is then provided with two elastic legs one of which engages the outer side and the other of which engages the inner side of the hub whereby the other leg biases the inner end of the film against the hub.

The novel features which are considered as characteristic of the invention are set forth in particular in the appended claims. The improved cassette and reel, however, both as to their construction and the mode of using the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
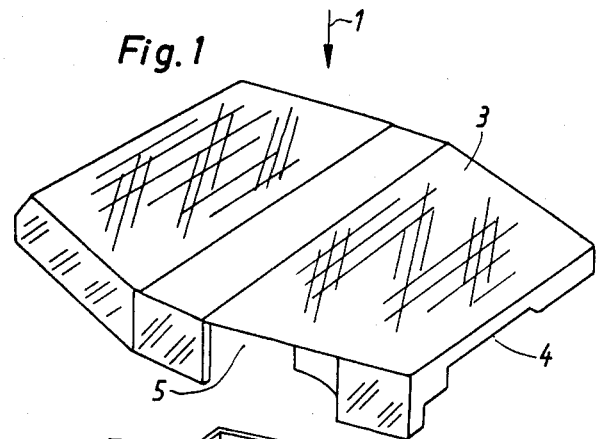
FIG. 1 is an exploded perspective view of a cassette which embodies one form of the invention and wherein the film retaining member is attached directly to one shell of the housing of the cassette.
Figure 2:
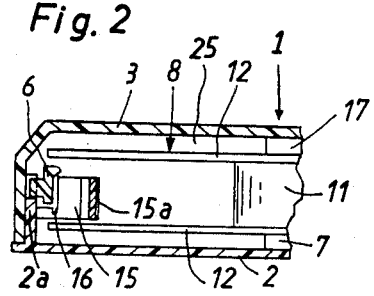
FIG. 2 is a fragmentary axial sectional view of a fully assembled cassette, substantially as seen in the direction of arrows from the line II—II of FIG. 1.

Referring to FIGS. 1 and 2, there is shown a cartridge or cassette 1 which comprises a housing composed of two sections or halves including a base 2 and a cover 3. When the housing of the cassette 1 is assembled, the sections 2, 3 define a first opening 4 for withdrawal of the leader of motion picture film and a second opening 5 which allows a friction wheel, not shown, to move into engagement with the flanges 12 of a properly inserted supply reel 8 (see FIG. 3) in order to rotate the reel in a direction to collect the film. The sections 2, 3 preferably consist of synthetic plastic material and define a chamber 25 for reception of a supply reel.

The base 2 supports an arcuate confining member 6 which extends into the space between the flanges 12 of a supply reel 8 which is properly inserted into the chamber 25 to prevent uncontrolled unwinding of film which is convoluted around the hub 11 of the supply reel. The confining member 6 can be glued, welded or otherwise secured to the base 2 and can be considered as forming an integral part of the housing. The central portion of the base 2 is further provided with an inwardly extending centering member or mandrel 7 which cooperates with a similarly configurated mirror symmetrical centering member or mandrel 17 (FIG. 2) of the cover 3 to center the supply reel 8 in requisite position in the chamber 25 of the housing of the cassette 1 so that the reel can rotate about its axis.

Figure 3:
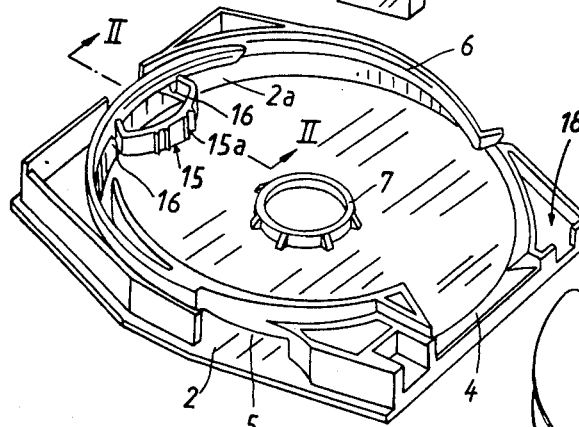
FIG. 3 is a perspective view of a novel supply reel which can be inserted into the cassette of FIG. 1, further showing the film retaining member separated from the cassette and in a position of registry with the socket in the hub of the supply reel.
Figure 3:
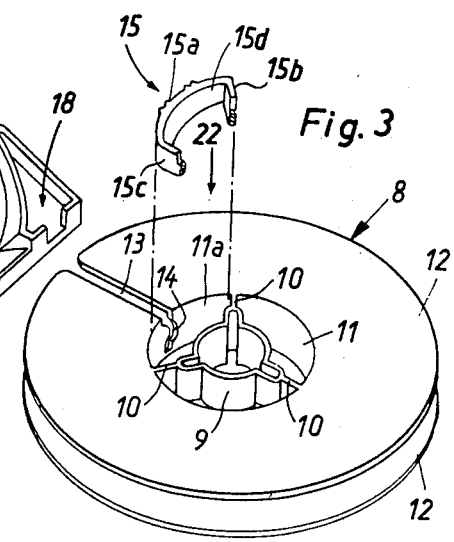

The details of a supply reel 8 which can be used in the cassette 1 of FIGS. 1 and 2 are illustrated in FIG. 3. The supply reel 8 comprises the aforementioned flanges 12 which extend radially outwardly from the end portions of the hub 11. The hub 11 is of cylindrical shape and has inwardly extending connecting means in the form of arms or ribs 10 for supporting and centering a central core 9. One of the flanges 12 is provided with a radially inwardly extending break or slot 13 which communicates with a film threading slot 14 in the hub 11. The convolutions of motion picture film (not shown) surround the hub 11 and the trailing or inner end of such film extends through the slot 14 into a space or socket 11a bounded by the internal surface of the hub 11, by two arms 10 and by a portion of the external surface of the central core 9.

If the cassette 1 is to be used in a motion picture projector which is provided with automatic rewinding means for the film, i.e., with a rewinding means which can include the aforementioned friction wheel so that the latter can be moved into the opening 5 to engage the flanges 12 and to rotate the supply reel 8 in a direction to collect the film upon completion of the projection cycle, the inner end of the film must be securely clamped to the hub 11. This is necessary because the rewind cycle is normally started in automatic response to tensioning of the trailing portion of the film when the major part of the film is already convoluted on the takeup reel (not shown) upon completion of the projection cycle. Such connection between the inner end of the film and the hub 11 can be established by a novel film retaining or clamping member 15 which is preferably elastic to act not unlike a leaf spring and is insertable into the socket 11a after the inner end of the film has been caused to enter the socket by way of the slot 14. As shown in FIG. 3, the retaining member 15 has an arcuate portion 15d which can engage the inner side of the hub 11 and two legs 15b, 15c which can engage those arms 10 which flank the socket 11a. The retaining member 15 is a tight fit in the socket 11a (it is preferably insertable into the socket in response to at least some deformation). The inner end of the film which extends into the socket 11a by way of the slot 14 is thereby caused to flex sideways and to lie adjacent to the inner side of the hub 11. In order to further reduce the likelihood of withdrawal of the inner end of film from the socket 11a, the convex outer side of the arcuate portion 15d of the retaining member 15 is preferably provided with teeth, pins, ribs or analogous friction generating projections 15a which can press the film against the inner side of the hub 11 in the socket 11a to thus prevent withdrawal of the inner end portion when the last or innermost convolution of the film is withdrawn from the space between the flanges 12 and the takeup reel still tends to rotate in a direction to collect the film. The resulting tensioning of the film triggers the rewind cycle which is terminated when the entire film is convoluted onto the hub 11.

As a rule, the retaining member 15 should be forced into the socket 11a only when the supply reel 8 is to be inserted into a cassette 1 for use in cassette-loaded motion picture projectors having automatic rewinding means for the film. This is due to the fact that, in motion picture projectors without the automatic rewind feature, the inner end of the film should be permitted to become completely separated from the supply reel. In accordance with one feature of the invention, the retaining member 15 is separably secured to the base 2 of the cassette 1 in such a way that a supply reel 8, with a motion picture film convoluted around its hub 11, cannot be properly inserted into the chamber 25 unless the retaining member 15 is detached from the base 2. In the embodiment of FIGS. 1 and 2, the retaining member 15 is attached to the wall 2a which faces the opening 4 of the cassette 1. As shown in FIG. 2, the retaining member 15 extends into the space between the flanges 12 of an empty supply reel 8 when the latter is properly installed in the chamber 25 of the cassette 1. However, if the hub 11 of the supply reel 8 is surrounded by convoluted motion picture film, the supply reel 8 cannot be inserted into the chamber 25 to assume the position shown in FIG. 2. Consequently, the operator who is attempting to insert into the cassette 1 a supply reel 8 with motion picture film thereon notes that the insertion is not possible without detaching the retaining member 15 from the base 2. Once the retaining member 15 is detached, it is inserted into the socket 11a and thereby prevents withdrawal of the inner end of the film. The aforementioned confining member 6 is mounted on the base 2 in such a way that the supply reel 8 can be inserted into the recess (portion of chamber 25) of the base 2 only in the direction from the opening 4 toward the wall 2a, i.e., lengthwise of the base 2. While attempting to insert a supply reel with a film which is convoluted around the hub 11, the operator notes that the insertion is not possible because the outermost convolution of the film abuts against the arcuate portion 15d before the hub 11 registers with the centering mandrel 7.

The retaining member 15 does not interfere with insertion of an empty supply reel 8 (see FIG. 2). Therefore, when the cassette 1 is to be used in motion picture projectors without an automatic rewind feature, the cassette 1 can be furnished or sold with the supply reel 8 mounted in the position shown in FIG. 2. The retaining member 15 cannot be lost or misplaced because it adheres to the wall 2a of the base 2. Also, such member does not contribute to the bulk of the cassette 1 because it is located in the chamber 25.

The retaining member 15 can be made integral with the base 2, especially if such parts consist of a suitable synthetic plastic material and are formed by injection molding or a like procedure. In order to facilitate rapid and effortless separation of the retaining member 15 from the base 2, the connecting portions between these parts are preferably weakened by the provision of notches or grooves as indicated at 16. When the member 15 is broken off and inserted into the socket 11a, and the supply reel 8 is thereupon inserted into the base 2, the surfaces where the member 15 has been separated from the base 2 are located radially outwardly of the film-engaging surface of the confining member 6, i.e., outside of the path of motion picture film. This is desirable in order to prevent scratching of or other damage to the film if the surfaces where the member 15 is broken off exhibit ragged edges.

Figure 4:
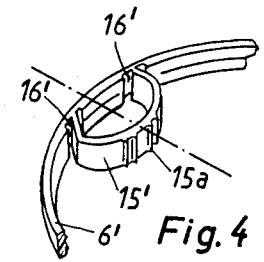
FIG. 4 is a perspective view of a second film retaining member which is provided on a film confining device for use in the cassette of the present invention.

FIG. 4 illustrates a second embodiment of the invention. The film retaining or clamping member 15' is integral with but is readily separable from the arcuate confining member 6'. The weakened portions 16' between the parts 6' and 15' are recessed into the concave surface of the confining member so as to prevent scratching of or other damage to the film in the event that the surfaces where the member 15' is separated exhibit ragged edges. An advantage of the embodiment of FIG. 4 is that the parts 6' and 15' can be produced in a single operation in relatively simple molds, for example, by injection molding.

Figure 5:
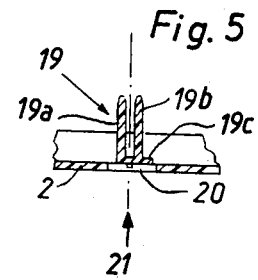
FIG. 5 is a fragmentary sectional view of one section of a cassette which carries a U-shaped film retaining member.

It is equally within the purview of the invention to connect the film retaining member with one section of the cassette 1 in a region where the retaining member does not interfere with insertion of an empty or with insertion of a film-supporting supply reel, i.e., to locate the retaining member outside of that portion of the chamber 25 which is to accommodate the supply reel. This modification is indicated in FIG. 1 where the arrow 18 points out a possible location for a retaining or clamping member without the area which serves to accommodate the supply reel. The configuration of a retaining or clamping member 19 which can be made integral with the base 2 in the space indicated by the arrow 18 of FIG. 1 is shown in FIG. 5. This retaining member is U-shaped and has two elastic legs 19a, 19b and a web 19c which is integral with the base 2. The weakened portion 20 which connects the web 19c with the base 2 forms a circle or an ellipse and permits such separation of the retaining member 19 that the web 19c forms a disk. The separation can take place by the application of some pressure in the direction indicated by the arrow 21. The disk-shaped web 19a can be readily manipulated by fingers during attachment of the retaining member 19 to the supply reel in such position that the retaining member clamps the inner end of the film to the hub 11. The retaining member 19 is attached by moving in the direction indicated in FIG. 3 by the arrow 22 so that one of the legs 19a, 19b engages the outer side and the other leg engages the inner side of the hub 11 whereby the other leg presses the inner end of the film against the inner side of the hub. The web 19c is then adjacent to the upper axial end of the hub 11, as viewed in FIG. 3. Thus, one of the legs 19a, 19b extends into the space between the flanges 12 and the other leg extends into the socket 11a.

It is further possible to mount the retaining member in or on another part of the section 2 or 3, for example, adjacent to the centering member 7 of the base 2 or adjacent to the centering member 17 of the cover 3. The retaining member then extends beyond the centering member 7 or 17 and prevents the insertion of a supply reel 8. This indicates to the operator that the retaining member must be separated from the base 2 or cover 3 and that it must be utilized to secure the inner end of convoluted motion picture film to the hub 11. Still further, the retaining member can be provided in or on the base 2 or cover 3 in such a way that, when it becomes separated from the respective section of the cassette 1, there develops an opening or window which is needed when the cassette is properly mounted in or on a motion picture projector. For example, the separation of the retaining member can result in the provision of the corresponding half of the opening 4 or 5 in the section 2 or 3. Finally, it is also possible to mass-produce the retaining member independently of the sections 2, 3 and to attach the retaining member to one of these sections by means of an adhesive or the like so as to permit rapid and effortless separation of the retaining member for the purpose of securing the inner end of a motion picture film to the hub of the supply reel.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A cassette for use in cassette-loaded cinematographic apparatus, comprising a housing defining a chamber for reception of a reel of the type having a hub surrounded by a supply of convoluted motion picture film having an inner end adjacent to the hub; and a film retaining member separably secured to said housing in a first position, said member being movable upon separation thereof from said housing to a film retaining second position in which said member clamps the inner end of film to the hub of a reel.

2. A cassette for use in cassette-loaded cinematographic apparatus, comprising a housing defining a chamber for reception of a reel of the type having a hub surrounded by a supply of convoluted motion picture film having an inner end adjacent to the hub; and a film retaining member for clamping the inner end of film to the hub of a reel, said retaining member being separably secured to said housing in a region other than that occupied by a reel in said chamber.

3. A cassette as defined in claim 1, wherein said retaining member is located in said chamber in said first position thereof.

4. A cassette as defined in claim 3, wherein said retaining member is located in said first position thereof in that portion of said chamber which is occupied by a properly inserted film-supporting reel.

5. A cassette for use in cassette-loaded cinematographic apparatus, comprising a housing defining a chamber for reception of a reel of the type having a hub surrounded by a supply of convoluted motion picture film whose inner end is adjacent to the hub and a pair of spaced flanges extending radially outwardly from the hub; and a film retaining member for clamping the inner end of film to the hub of a reel, said retaining member being separably secured to said housing and being located in said chamber between the flanges of a properly inserted film-supporting reel.

6. A cassette for use in cassette-loaded cinematographic apparatus, comprising a housing defining a chamber for reception of a reel of the type having a hub surrounded by a supply of convoluted motion picture film having an inner end adjacent to the hub; and a film retaining member for clamping the inner end of film to the hub of a reel, said retaining member being separably secured to said housing by an adhesive.

7. A cassette for use in cassette-loaded cinematographic apparatus, comprising a housing defining a chamber for reception of a reel of the type having a hub surrounded by a supply of convoluted motion picture film having an inner end adjacent to the hub; and a film retaining member for clamping the inner end of film to the hub of a reel, said retaining member being integral with and separable from said housing.

8. A cassette as defined in claim 7, wherein said housing comprises readily breakable portions connecting said retaining member with the housing.

9. A cassette as defined in claim 8, wherein said readily breakable portions are located without the path of film on a properly inserted reel in said chamber.

10. A cassette for use in cassette-loaded cinematographic apparatus, comprising a housing comprising a plurality of separable sections defining a chamber for reception of a reel of the type having a hub surrounded by a supply of convoluted motion picture film having an inner end adjacent to the hub; and a film retaining member for clamping the inner end of film to the hub of a reel, said retaining member being separably secured to one of said sections.

11. A cassette as defined in claim 10, further comprising film confining means provided on said one section, said retaining member being secured to said confining means.

12. A reel for storage in cassettes for use in cassette-loaded cinematographic apparatus, comprising a substantially cylindrical hub having a slot; a pair of flanges extending radially outwardly from the axial ends of said hub; a central core surrounded by and spaced from said hub; connecting means extending between said hub and said core, said connecting means defining with said hub and said core a socket communicating with said slot and arranged to receive the inner end of a supply of motion picture film which is convoluted on said hub between said flanges, said connecting means comprising a pair of substantially radially extending arms flanking said socket; and a film retaining member at least partially received in a portion of said socket to urge the inner end of the film against said hub, said retaining member including an arcuate portion inwardly adjacent to said hub in said socket and two legs each abutting against a different arm of said connecting means.

13. A reel as defined in claim 12, wherein said retaining member further includes friction generating means engaging with the film in said socket.

14. A reel for storage in cassettes for use in cassette-loaded cinematographic apparatus, comprising a substantially cylindrical hub having a slot; a pair of flanges extending radially outwardly from the axial ends of said hub; a central core surrounded by and spaced from said hub; connecting means extending between said hub and said core, said connecting means defining with said hub and said core a socket communicating with said slot and arranged to receive the inner end of a supply of motion picture film which is convoluted on said hub between said flanges; and a U-shaped film retaining member at least partially received in a portion of said socket to urge the inner end of the film against the hub, said retaining member comprising two legs one of which is outwardly adjacent to said hub and the other of which is inwardly adjacent to said hub in said socket to bias the inner end of film against said hub.

* * * * *